United States Patent
Taha et al.

(10) Patent No.: US 10,494,299 B2
(45) Date of Patent: Dec. 3, 2019

(54) ELECTRICALLY AND THERMALLY CONDUCTIVE POLYMER CONCRETE

(71) Applicant: STC.UNM, Albuquerque, NM (US)

(72) Inventors: Mahmoud Reda Taha, Albuquerque, NM (US); Usma Farid Kandil, Cairo (EG); Ala Eddin Douba, Albuquerque, NM (US); Mehmet Emiroglu, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/742,852

(22) PCT Filed: Jul. 8, 2016

(86) PCT No.: PCT/US2016/041611
§ 371 (c)(1),
(2) Date: Jan. 8, 2018

(87) PCT Pub. No.: WO2017/008048
PCT Pub. Date: Jan. 12, 2017

(65) Prior Publication Data
US 2018/0370854 A1    Dec. 27, 2018

Related U.S. Application Data

(60) Provisional application No. 62/190,112, filed on Jul. 8, 2015, provisional application No. 62/321,453, filed on Apr. 12, 2016.

(51) Int. Cl.
| | |
|---|---|
| *C04B 26/02* | (2006.01) |
| *C04B 26/14* | (2006.01) |
| *C04B 14/02* | (2006.01) |
| *C01B 32/174* | (2017.01) |
| *C04B 111/00* | (2006.01) |
| *C04B 111/94* | (2006.01) |

(52) U.S. Cl.
CPC ............ *C04B 26/14* (2013.01); *C01B 32/174* (2017.08); *C04B 14/026* (2013.01); *C01B 2202/06* (2013.01); *C01B 2202/22* (2013.01); *C01B 2202/24* (2013.01); *C01P 2002/82* (2013.01); *C04B 2111/00008* (2013.01); *C04B 2111/00465* (2013.01); *C04B 2111/94* (2013.01)

(58) Field of Classification Search
CPC ....... C04B 26/14; C04B 14/026; C04B 26/02; C01B 32/174; C01B 2202/06
USPC ......................................... 523/220
See application file for complete search history.

(56) References Cited

U.S. PATENT DOCUMENTS

| | | | |
|---|---|---|---|
| 6,079,277 A * | 6/2000 | Chung | ................ G01B 7/18 73/774 |
| 8,426,501 B1 | 4/2013 | Taha et al. | |
| 9,987,608 B2 * | 6/2018 | Pigos | ................ B01J 13/0095 |
| 2009/0229494 A1 | 9/2009 | Shah et al. | |
| 2013/0276674 A1* | 10/2013 | Korzhenko | ............. C04B 26/28 106/804 |

FOREIGN PATENT DOCUMENTS

| | | |
|---|---|---|
| RU | 2404201 C2 | 11/2010 |
| SU | 844990 A1 | 7/1981 |

OTHER PUBLICATIONS

Federal Institute of Industrial Property; International Written Opinion and Search Report for PCT/US2016/041433; dated Nov. 17, 2016; 6 pages; Moscow, RU.

* cited by examiner

*Primary Examiner* — Hannah J Pak
(74) *Attorney, Agent, or Firm* — Keith Vogt, Ltd.; Keith A. Vogt

(57) ABSTRACT

An electrically and thermally conductive polymer concrete (made of a polymer and aggregate particles without cement) comprising non-functionalized nanoparticles (e.g. non-functionalized multi-walled carbon nanotubes (NF-MWCNTs), non-functionalized carbon nanofibers, non-functionalized nanoalumina) dispersed therein and methods of making same.

7 Claims, 9 Drawing Sheets

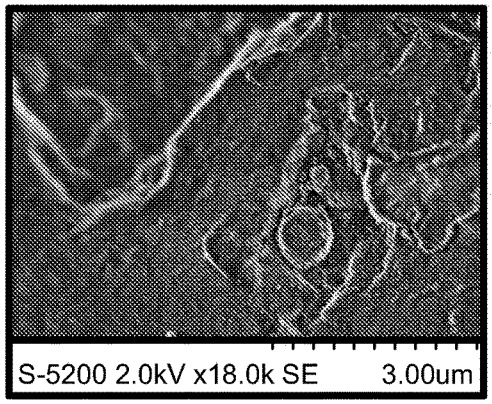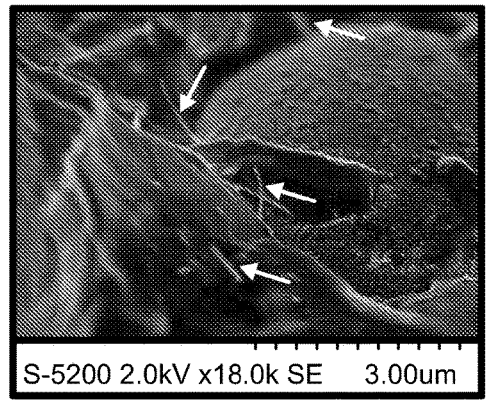
FIG. 6A  FIG. 6B
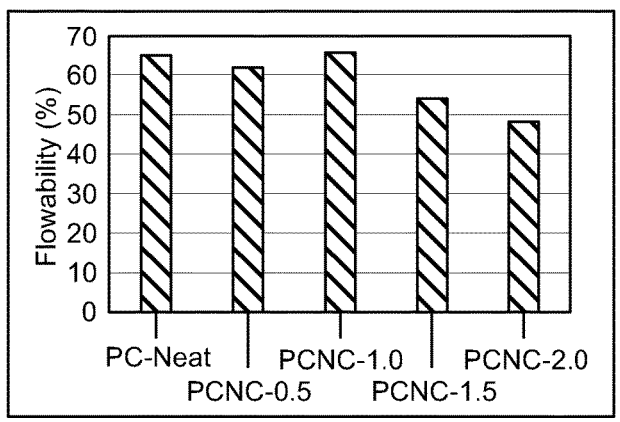
FIG. 7
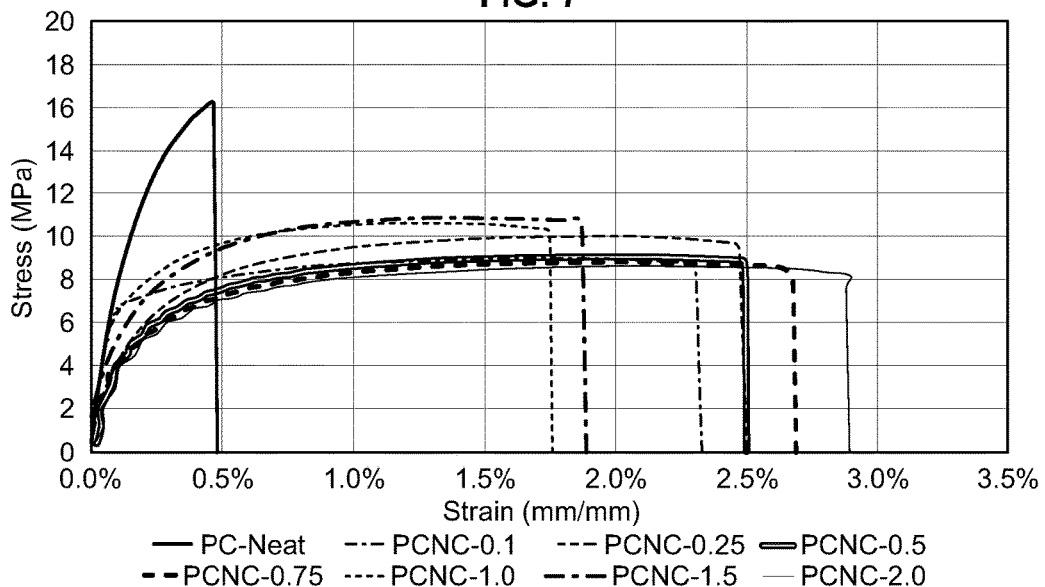
FIG. 8A

ELECTRICALLY AND THERMALLY CONDUCTIVE POLYMER CONCRETE

RELATED APPLICATIONS

This application claims the benefit of U.S. Provisional Application No. 62/190,112 filed Jul. 8, 2015 and herein incorporated by reference. This application also claims the benefit of U.S. Provisional Application No. 62/321,453 filed Apr. 12, 2016 and herein incorporated by reference.

BACKGROUND OF THE INVENTION

Polymer concrete (PC) is a well-known industrial material used for many infrastructure applications including bridge deck overlays, manholes, coating layers for metallic pipelines, repair for existing concrete structures, grout for post-tensioning ducts, machine foundations, etc.

In addition, polymer concrete (PC) overlays are typically used in infrastructure applications, specifically bridges and parking structures, to provide durable protection to the structural system against corrosion. However, PC suffers from cracking and crack propagation during its service life mostly due to fatigue. Fatigue cracking of PC results in limiting the service life of PC considerably. Monitoring of fatigue damage in PC can help extend PC service life.

Polymer concrete (PC) is also a composite material in which a polymer matrix such as epoxy, unsaturated polyester (UP), vinyleseter, or methyl methacrylate (MMA) replaces Portland cement as a binder to bond aggregate together. PC is used in numerous applications including bridge deck overlays, machine foundations, sewer manholes, pipes and pipe liners, hazard materials storage and architectural panels. PC gained worldwide attention in the construction field since the 1970s because of its superior durability and attractive mechanical properties.

Typical mechanical properties of PC incorporate a compressive strength of 50-100 MPa, a tensile strength of 8-10 MPa, a flexural strength of 20-24 MPa and a wide range of modulus of elasticity in the range of 20-40 GPa depending on the type of resin and aggregates used. PC also has superior fatigue strength compared with conventional Portland cement concrete. PC has also been reported to have excellent bond strength to different substrates including concrete and steel.

The improved mechanical characteristics of PC stem from a tight microstructure which allows PC to have excellent durability as well. The above attractive mechanical and durability characteristics promoted the use of PC as overlays in bridge decks and parking structures. While PC overlays have been used in numerous bridges and parking structures worldwide, they have been reported to suffer fatigue cracks that lead to premature debonding. Methods to improve fatigue strength of PC have been sought.

Carbon nanotubes (CNTs) have been utilized as nanofillers and/or nanoreinforcement to improve the mechanical properties of polymers. CNTs have remarkable strength and stiffness properties and are considered as one of the most attractive materials with very high strength and stiffness to weight ratios. The relatively high aspect ratio of CNTs allows them to improve load transfer in polymer matrices, and as such was reported to significantly improve the tensile and flexural strength and modulus as well as fracture toughness of epoxy.

Furthermore, researchers showed that well dispersed CNTs can significantly improve the electrical conductivity of polymers. This is attributed to the ability of the CNTs to form a network of connected conductive fibers inside the polymer matrix and thus improve its electrical conductivity by a few orders of magnitude. However, the above improvements in polymers using CNTs are conditioned by achieving a good dispersion of CNTs inside the polymer matrix. The very high surface area of CNTs generates strong intrinsic van der Waals forces between individual tubes that cause CNTs to agglomerate in bundles. Agglomerations cause CNTs to have a very low solubility in most solvents, often resulting in a non-homogenous dispersion within a surrounding matrix. Homogenous dispersion is crucial for matrix enhancement, because it increases the surface area of nanotubes that is available for interaction with the matrix. Therefore, it is essential to ensure the homogeneous dispersion of CNTs throughout a composite matrix.

Recently, researchers have improved the mechanical properties of polymer concrete using nanoparticles such as nanoclay, carbon nanotubes, and carbon nanofibers. It was reported the ability to significantly enhance the mechanical and thermal characteristics of performance of UP polymer concrete using nanoclay. Other research has reported a reduction in the flexural strength of PC incorporating nanoclay. It also has been shown that the ability of COOH—functionalized multi-walled Carbon nanotubes (MWCNTs) improve the impact strength of epoxy PC. This improvement was attributed to the ability of functionalized MWCNTs to bond with the epoxy matrix and create a new epoxy-MWCNTs nanocomposite with improved impact and flexural strength.

It has also been long realized that structural collapse of concrete elements under extreme loading events (e.g. earthquakes, hurricane, floods) takes place because of exceeding the displacement and/or strain limits of concrete elements. Concrete ductility, therefore, represents a major challenge necessary to overcome and to prevent the progressive collapse of concrete structures exposed to extreme events. Resilient infrastructure is defined as infrastructure that are designed to survive extreme events and to overcome extreme deformations without observing extreme damage. Developing concretes with extreme ductility is a major step towards resilient infrastructure.

BRIEF SUMMARY OF THE INVENTION

In one embodiment, the present invention provides an electrically and thermally conductive polymer concrete (made of a polymer and aggregate particles without cement) comprising non-functionalized nanomaterials (e.g. non-functionalized multi-walled carbon nanotubes (NF-MWCNTs)) dispersed therein.

In other embodiments, the present invention provides a concrete having a homogeneous dispersion of nanomaterials such as NF-MWCNTs throughout a composite matrix.

In other embodiments, the present invention provides a concrete wherein NF-MWCNTs are added to a polymer matrix (e.g. epoxy).

In other embodiments, the present invention provides a concrete wherein NF-MWCNTs are added to a polymer matrix (e.g. epoxy) above percolation level (e.g. 2.0-wt %) as weight of total polymer (e.g. epoxy).

In other embodiments, the present invention provides a system and method of monitoring crack propagation in concrete structures by providing a layer/part of electrically conductive polymer concrete; establishing an electrical current in the electrically conductive polymer concrete layer/part; and measuring crack propagation in the layer/part as a function of reduced electrical conductivity.

In other embodiments, the present invention provides a concrete that is electrically conductive and thus may be used as a part of a cathodic protection system for corrosion protection of reinforced concrete structures.

In other embodiments, the present invention provides a concrete that is thermally conductive and thus may be used as an overlay for melting snow and ice on surfaces such as bridge decks and parking structures.

In other embodiments, the present invention provides a concrete that is self-healing as well being thermally and electrically conductive.

In other embodiments, the present invention provides specific combinations and/or mixes of nanomaterials to control polymer cross-linking while still providing appreciable strength such that the resultant polymer composite has extreme strain at failure and acceptable strength. A combination of desired mechanical properties of concrete never reported before in the literature can be achieved by controlling the amount of nanomaterials and mixture proportions of those materials (e.g. NF-MWCNTs and NF-nanoalumina).

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 6A is an SEM image of Neat PC.

FIG. 6B is an SEM image of PC incorporating 3.0 wt. %.

FIG. 7 shows flowability test results for an embodiment of the present invention.

FIG. 8A illustrates stress-strain in tension test for embodiments of the present invention.

DETAILED DESCRIPTION OF THE INVENTION

Figure 1:
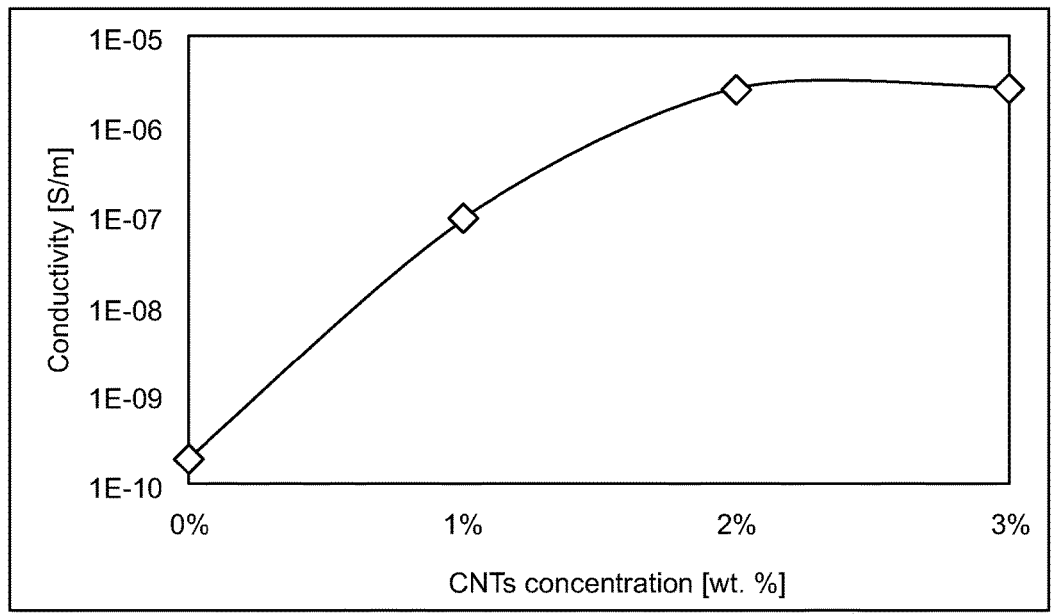
FIG. 1 illustrates the change in the electrical conductivity of NF-MWCNTs-epoxy nanocomposite with the change of NF-MWCNTs concentration for an embodiment of the present invention.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In one embodiment, the present invention concerns a conductive PC that uses carbon nanotubes. Polymers that may be used to create the PC may be different types of polymers such as epoxy with all its types, polymethyle methacrylate (PMMA), polyester, vinyleseter and polyurethane. The new concrete is produced by dispersing non-functionalized carbon nanotubes (NF-CNTs) with concentrations near, at or beyond the percolation limit (typically about 2-3% by weight of the polymer) within the polymer. In other embodiments, the present invention provides a concrete having a homogeneous dispersion of carbon nanotubes throughout a composite matrix.

In other embodiments, the present invention provides a method that includes steps to ensure uniform dispersion of the NF-CNTs. The polymer-NF-CNTs nanocomposite is mixed with the concrete aggregate and the hardener is then added. No cement is used to produce concrete of this embodiment of the present invention. In other embodiments of the present invention, cement may be used in certain applications. The product material will have strengths similar or higher than typical PC, energy absorption characteristics similar or higher than conventional PC, failure strains similar or higher than conventional PC, electrical conductivity that is orders of magnitude higher than conventional PC. The use of conductive microstructure network of NF-CNTs inside the PC allows the new PC to have self-sensing capability.

Cost for producing the new conductive PC is comparable to conventional PC. This is attributed to the fact that the amount of NF-CNTs necessary to produce conductive PC is very limited (about 1-2% of the weight of the polymer). Analysis shows material costs will result in less than 15% increase in PC cost. Relatively affordable technology such as calendaring may be used to disperse NF-CNTs in the polymer material.

In other embodiments, imbuing the PC with conductivity provides for configuration into a number of useful applications. In one embodiment, the conductive concrete may be a valuable part of a cathodic protection system that may be used to prevent corrosion and elongate life of infrastructure under risk of corrosion. This is because conductive PC will enable easy access of the electrical current to the structure and thus reduce cost and complexity of cathodic protection systems. In one embodiment of the present invention, the conductive PC is used to generate a protective current that opposes the corrosion current. This protective current may be used to polarizes any reinforcing steel in a way that the steel cannot corrode or limits any corrosion.

Moreover, a thermally conductive PC overlay may use resistive heating to melt snow and ice by keeping the overlay above freezing temperature. Furthermore, the improved electrical and thermal conductivities add self-sensing and self-healing capabilities to PC. One possible mechanism of self-healing is to conduct energy to the location of damage/cracking. This can only occur if material to be healed is energy conductive. The use of NF-nanomaterials (NF-MWCNTs, NF-Nanoalumina, others) will enable altering the PC to a conductive media and thus enabling self-healing through energy conduction.

In yet other embodiments, the present invention uses carbon nanotubes to monitor damage initiation and propagation in PC under fatigue loading. PC prisms were produced using epoxy polymer concrete with varying contents of non-functionalized multi-walled carbon nanotubes (NF-MWCNTs). The percolation level of NF-MWCNTs necessary to produce a conductive PC was first determined. Fatigue testing using an AASHTO modified test set-up was conducted. Electrical conductivity of PC overlay was continuously measured during fatigue testing. Damage initiation and propagation in PC incorporating MWCNTs overlays can be detected and monitored.

Other embodiments of the present invention use NF-MWCNTs to improve the fatigue strength of epoxy PC. Dispersing NF-MWCNTs above the percolation limit improves the flexural strength of epoxy PC and creates a network of conductive NF-MWCNTs fibers that enables PC to be conductive. This not only improves the flexural and fatigue strength of PC but will also enable monitoring crack propagation in PC under static and cyclic loading. Successful monitoring of crack propagation in PC can enable early warning and thus allows interference to prevent fatigue cracking. Such development can extend the service life of bridge deck overlays and thus can be a critical development for PC overlays.

Non-functionalized Multi-walled carbon nanotubes (NF-MWCNTs) were provided by Cheap Tubes, Inc. In one embodiment of the present invention, they have an outer dimension of 20-30 nm, an inner dimension of 5-10 nm, and a length of 10-30 µm. The polymer that may be used is polysulfide epoxy including silane. The resin is a mixture of Bisphenol A/Epichlorohydrin Epoxy Resin including silane. The hardener is Diethylenetriamine (DETA), Phenol, 4,4'-(1-methylethylidene)bis-, and Tetraethyllenepentamine. The filler used in all mixes is crystalline silica (quartz) and ceramic microspheres including but not limited to powders.

Four different PCs with different concentrations of NF-MWCNTs including 0% (Neat), 1.0%, 2.0%, and 3.0% of the total epoxy weight where prepared. To achieve good dispersion of NF-MWCNTs in PC, NF-MWCNTs were first added to the required amount of the epoxy resin and the mix was magnetically stirred for 2 hours at 110° C. The relatively high mixing temperature was required to reduce the epoxy resin viscosity and thus improve dispersion. Next, the epoxy resin-NF-MWCNTs mix was sonicated for two hours at 60° C. Sonication generates sound waves, which creates microscopic bubbles that improve the dispersion of the nanoparticles. The mix was then cooled to room temperature and the epoxy resin-NF-MWCNTs mix was then mixed with the hardener for 3 minutes. Part of the epoxy-NF-MWCNTs polymer nanocomposite was cast in 25mm×1.0 mm×75 mm thin prisms. Silica filler was then added to the remaining epoxy-MWCNTs polymer nanocomposite and this was mixed in a regular mortar mixer for 2-3 additional minutes. The PC incorporating NF-MWCNTs was then cast in 25mm×25mm×225mm prisms.

The electrical conductivity test of the NF-MWCNTs-epoxy polymer nanocomposites was performed according to ASTM D257. Electrical measurements were performed using a Keithly 2636b source meter and strip electrodes via a standard two-probe configuration. Silver paint was used to ensure good contact between the specimens and the electrode. The electrical conductivity of the polymer nanocomposite specimen (σ) was calculated using Eq. 1, $$\sigma = \frac{L}{AR} \tag{1}$$

A is the cross-sectional area, L is the length, and R is the measured electrical resistance.

Four-point bending test under static and cyclic loads were performed to investigate the behavior of the PC overlay using a MTS Bionex servo hydraulic machine. For the absence of a standard concrete fatigue test, the set-up followed AASHTO standards T321-07. The test set-up was designed to hold two LVDTs at the centerline of the tested specimen in order to record the displacement. Static loading 4-point bending was conducted as displacement control test with a loading rate of 2 mm/min. The fatigue test was conducted as a force control cyclic four-point bending test. The reason for conducting the fatigue test in load control was to ensure constant mean stress and stress amplitude during the test for all the different types of PC. In the cyclic load test, the PC specimen was subjected to ramp load with a loading rate of 100 N/min. After reaching a stress equivalent to 50% of the ultimate strength of the Neat PC, the specimen was subjected to a cyclic load with mean stress equivalent to 40% of the ultimate strength of the neat PC and stress amplitude of 10%. The load was applied at a frequency of 10 Hz. Throughout the test, time, load, and displacement were recorded using MTS® 793 data acquisition system with a sampling rate of 100 Hz. Three specimens of each PC mix were tested under flexural load until failure.

Moreover, during both the static load and the cyclic load tests the electrical resistance of the PC specimens incorporating NF-MWCNTs were recorded. Damage in the PC under both static and cyclic flexural test was determined in terms of the change of the electrical resistance during loading. The electrical resistance was measured and the damage feature $\lambda(t)$ was calculated as suggested by Eqn. 2. The electromechanical damage feature measured at time t is represented by $\lambda(t)$; $R(t_0)$ is the initial electrical resistance of the PC beam prior to load application at $t_0$; and $R(t)$ is the electrical resistance of the PC beam at time t $$\lambda(t) = \frac{R(t) - R(t_0)}{R(t_0)} (\%) \quad (2)$$

Scanning Electron Microscope (SEM) was used to investigate the dispersion of MWCNTs in the polymer matrix. Fractured surfaces of the PC were obtained from the flexural specimens after failure. The specimens were coated with gold and observed under Hitachi S-5200 Nano SEM at 2 kV.

FIG. 1 shows the change in electrical conductivity ($\sigma$) of the epoxy-NF-MWCNTs nanocomposites with the change of the NF-MWCNTs concentrations. As shown, the neat epoxy acts an insulator and has a very low electrical conductivity of approximately $2.0 \times 10^{-10}$ S/m. The electrical conductivity of epoxy-NF-MWCNTs nanocomposite increases as the concentration of NF-MWCNTs increases. The percolation level can be determined from FIG. 1 at 2.0 wt. % with an electrical conductivity of $3.0 \times 10^{-6}$ S/m which is a three orders of magnitude increase compared with neat epoxy.

Figure 2:
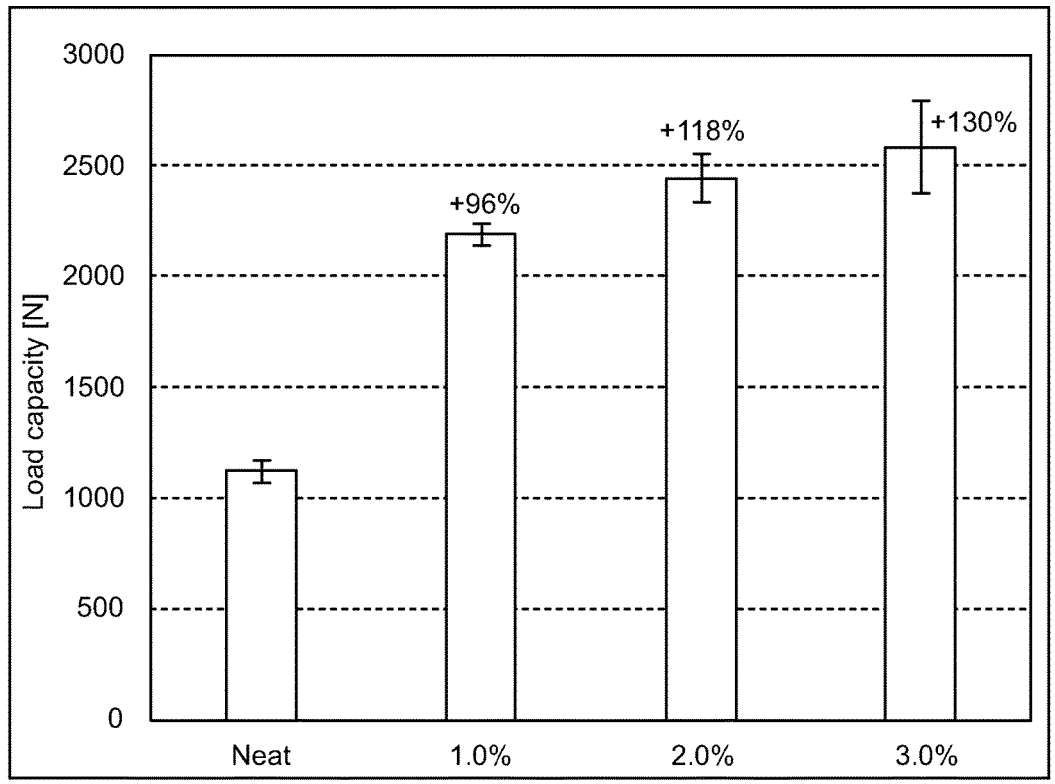
FIG. 2 illustrates the flexural capacity of PC incorporating NF-MWCNTs with different NF-MWCNTs concentration for an embodiment of the present invention.
Figure 3A:
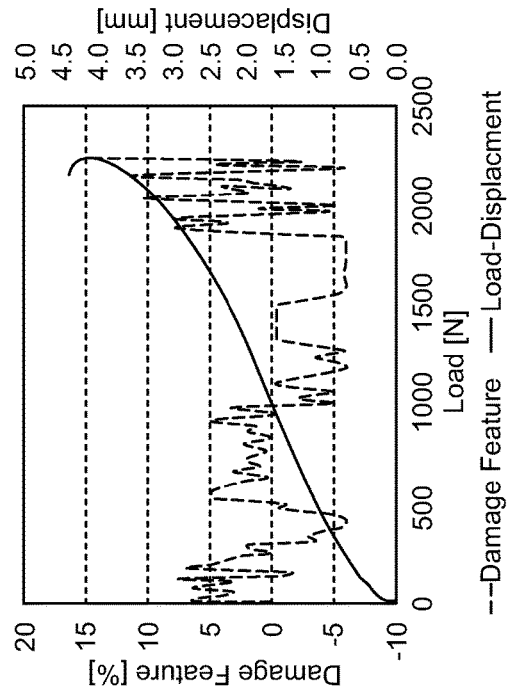
FIG. 3A shows the load-damage feature and load-displacement curves for PC incorporating NF-MWCNTs at a concentration of 0% (Neat).
Figure 3B:
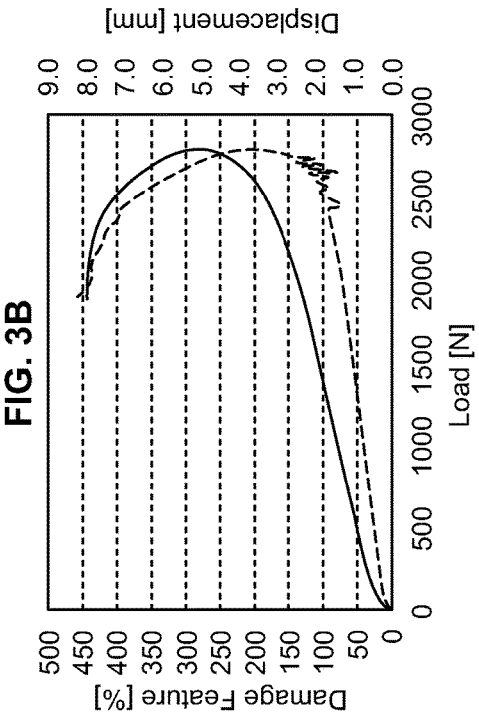
FIG. 3B shows the load-damage feature and load-displacement curves for PC incorporating NF-MWCNTs at a concentration of 1.0%.
Figure 3C:
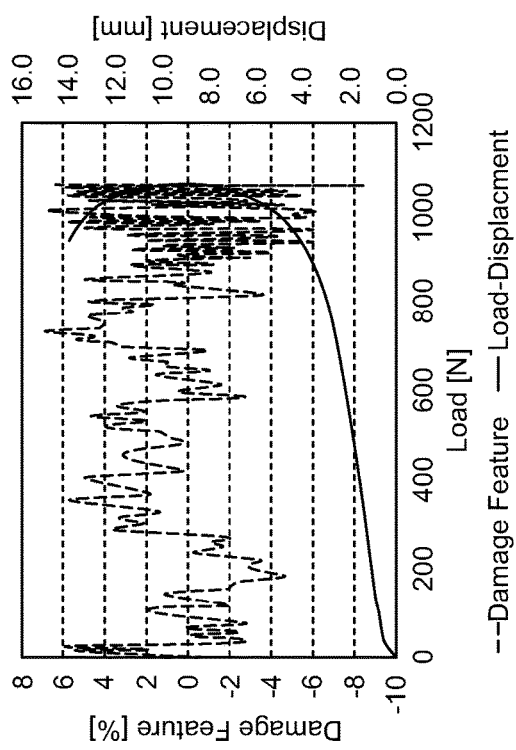
FIG. 3C shows the load-damage feature and load-displacement curves for PC incorporating NF-MWCNTs at a concentration of 2.0%.
Figure 3D:
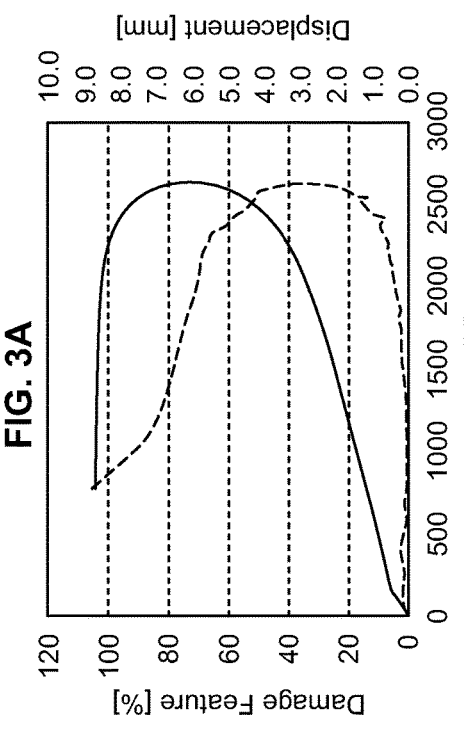
FIG. 3D shows the load-damage feature and load-displacement curves for PC incorporating NF-MWCNTs at a concentration of 3.0%.

The results of the static flexural test are shown in FIG. 2. The results show that incorporating NF-MWCNTs in the PC increased the flexural load capacity of PC significantly. MWCNTs were able to increase in the mean flexural load capacity of PC by 96%, 118%, and 130% compared with neat PC for 1.0 wt. %, 2.0 wt. % and 3.0 wt. % NF-MWCNTs respectively. While there is a statistically significant increase up to 2.0% NF-MWCNTs concentration, the increase in PC flexural capacity from 2.0 to 3.0 wt. % NF-MWCNTs is insignificant.

To demonstrate the benefits of the various embodiments, both electrical and mechanical damage was determined for mixes made in accordance with the embodiments of the present invention and existing mixes. Mechanical damage (D) is a quantification of the mechanical damage evolution. It is measured by the change in stiffness determined through flexural rigidity as follows.

$$D(i) = 1 - \frac{EI(i)}{EI(0)}$$

$$EI(i) = \left(\frac{5}{288}\right)\left(\frac{\Delta P(i)L^3}{\Delta \delta(i)}\right)$$

Where, D(i): mechanical damage.
EI(i): the flexural rigidity at the $i_{th}$ cycle.
$\Delta P(i)$: load range at the $i_{th}$ cycle.
L: span length.
$\Delta \delta(i)$: displacement range at the $i_{th}$ cycle.
Electrical damage feature ($\lambda$) is the change in electrical resistivity of the PC prism.

$$\lambda(t) = \frac{R(t) - R(t_0)}{R(t_0)} (\%)$$

Where, $\lambda(t)$: electrical damage feature at given time.
R(t): electrical resistivity at given time.
$R(t_0)$: the initial electrical resistivity.
Stress ($\sigma$) was also determined. It is the force exerted to deform a body in which acts on a unit area of the body.

$$\sigma = \frac{P}{A}$$

Where, $\sigma$: acting stress.
P: exerted force.
A: the area of the body where the force is applied.
Strain ($\varepsilon$) was also determined. It is a measure of the extent of deformation of a body under given stress.

$$\varepsilon = \frac{\Delta L}{L}$$

Where, $\varepsilon$: strain corresponding to a given stress.
$\Delta L$: the change in length due to applied stress.
L: original length of the sample in the direction of the stress.

The load-damage feature and load-displacement curves for different PC incorporating NF-MWCNTs are shown in FIGS. 3A-D. PC incorporating 0 wt. % (Neat) and 1.0 wt. % MWCNTs, the damage feature ($\lambda$) didn't show any trend and was oscillating around zero. This could be explained by the low electrical conductivity of the Neat and 1.0% PC. On the other hand, the electrical damage feature for the 2.0 wt. % and 3.0 wt. % specimens showed a trend mimicking that of mechanical damage feature. It can be inferred that one can then detect mechanical damage, which is very challenging to identify in a field setting, by observing the change in electrical conductivity of the various embodiments of the present invention. In this case as the stress increased, more cracks propagated in the matrix and thus interrupted the NF-MWCNTs network resulting in increasing resistivity and reduction in electrical conductivity. It is apparent that NF-MWCNTs can very well observe damage and crack propagation in PC under increased static loading.

Neat and 2.0 wt. % NF-MWCNTs PC were tested under cyclic flexural loads until failure. The failure of PC under cyclic loading is defined as total fracture of the specimen.

Figure 4:
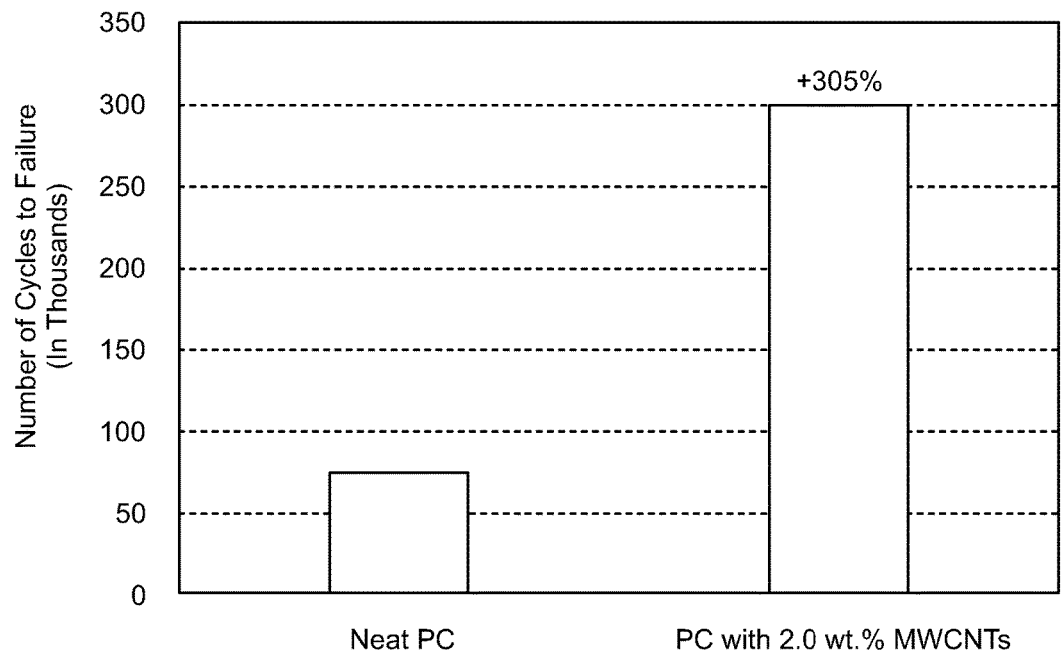
FIG. 4 illustrates the fatigue life of Neat PC and PC incorporating 2.0 wt. % NF-MWCNTs.
Figure 5:
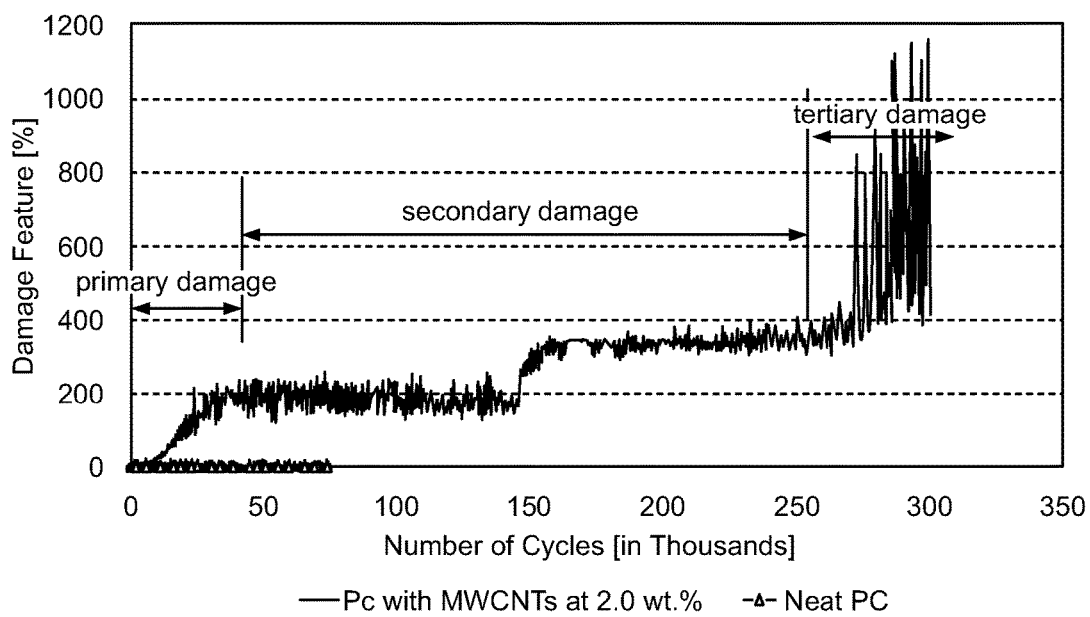
FIG. 5 illustrates the damage propagation during fatigue cycles of neat PC and PC incorporating 2.0 wt. % NF-MWCNTs determined using electrical conductivity measurements.

Incorporating 2.0 wt. % NF-MWCNTs in PC improved the fatigue strength of PC by more than 300% as shown in FIG. 4. This can be explained by the ability of NF-MWCNTs to induce dynamic strain hardening in the polymer nanocomposite, which leads to an increase of stiffness of the PC beam. Additionally, the presence of NF-MWCNTs have been shown to increase the crystallinity of the polymer matrix leading to superior resistance to crack propagation. In addition to increasing the fatigue life of PC, incorporating NF-MWCNTs, allowed monitoring damage and crack propagation in PC beams under cyclic loading using the electrical damage feature ($\lambda$). Similar to the static flexural observations, the neat PC specimen showed no change in the electrical damage feature throughout the test. On the other hand, PC incorporating 2.0 wt. % NF-MWCNTs showed a steady increase in the electrical damage feature up to 10 times the original measurement at failure. The electrical damage feature observed also demonstrated the classical change in mechanical from primary, secondary to tertiary damage as shown in FIG. S. It is evident that NF-MWCNTs can allow monitoring fatigue damage and crack propagation in PC.

SEM micrographs of fractured surfaces of neat and PC incorporating MWCNTs are shown in FIGS. 6A and 6B. FIG. 6A shows the neat PC with polymer formations across the cracks. On the other hand, FIG. 6B shows the fracture surface of PC incorporating 3.0 wt. % NF-MWCNTs. The spherical particles shown are the silica fine aggregate. The epoxy can be observed coating the silica particles. The SEM micrograph in FIG. 6B also shows the NF-MWCNTs as tubular fibers. It is obvious that NF-MWCNTs are well dispersed in the epoxy matrix and are existent at the fracture surface.

The significance of the addition of NF-MWCNTs to the epoxy matrix in producing epoxy PC was examined. It is evident that NF-MWCNTs significantly increased the electrical conductivity of epoxy and PC. A percolation level of 2.0-wt % by weight of total epoxy was observed. PC beams incorporating NF-MWCNTs were then tested under flexural static and cyclic loading. It was observed that the addition of NF-MWCNTs to the PC matrix increased the static flexural strength of PC by 96% to 130% for 1.0, 2.0 and 3.0 wt. % NF-MWCNTs. Moreover, the use of 2.0 wt. % NF-MWCNTs enabled an increase in the fatigue life of PC by 305%. Furthermore, incorporating NF-MWCNTs enabled monitoring of crack propagation in PC under both static and cyclic loading. As the load increased, PC cracks propagated and interrupted the NF-MWCNTs network. This in its turn reduced the electrical conductivity which was reflected by the proposed damage feature. Damage observed during fatigue crack propagation in PC using electrical measurement showed the same classical feature of damage propagation including primary, secondary and tertiary damage to failure. SEM micrographs showed the NF-MWCNTs were well dispersed in the epoxy matrix and were able to bridge PC microcracks thus improving the flexural and fatigue strength of PC. It is evident that NF-MWCNTs can be used to monitor fatigue damage propagation in the PC.

The present invention, in one aspect, also provides a new class of polymer concrete using a mix of epoxy materials, cement/silica fillers and nanomaterials. In a preferred embodiment, the present invention provides specific types of nanomaterials: non-functionalized multi-walled carbon nanotubes (NF-MWCNTs), non-functionalized carbon nanofibers and non-functionalized aluminum oxide nanoparticles and other nanoparticles that allows polymer concrete to show an appreciable tensile strength of 10-15 MPa and an extremely high tension strain at a failure of 3.0-4.0%. This is a significantly high strain at failure (superior ductility) for concrete elements compared with strain at failure of normal concrete 0.1-0.3% or strain at failure of near polymer concrete (0.50.6%). This superior ductility can help concrete structures to withstand under extreme events (e.g. earthquakes, floods and tornados)

Tension strain at failure is a typical measure for ductility for all structural materials. The new concrete tension strain at failure (ductility) is an order of magnitude higher than tension strain at failure of typical polymer concrete (about 0.3%) and about 30 times tension strain at failure of normal concrete (0.1-0.3%). The new polymer concrete is also flowable and can be used to produce different concrete elements, ties, beams, panels without any casting problems. Flowability of the various embodiments of the present invention can be controlled such that it can be used for 3D printing applications. The tensile strength and strain of the new polymer concrete with non-functionalized nanomaterial is a breakthrough for many infrastructure applications.

The various embodiments of the present invention can be used to produce redundant structural elements such as bracing elements, beams, panels that can prevent progressive collapse of structures and can be used in producing the new generation of resilient infrastructure (bridges, buildings, elements in dams, etc.) under extreme events that has been widely sought.

In other embodiments, the present invention improves fracture toughness of polymer concrete (PC) using non-functionalized Multi-Walled Carbon Nanotubes (NF-MWCNTs). At 0.5 wt. % content NF-MWCNTs may be used to produce a nano-scale effect that promotes use as a nanocomposite. Accordingly, an amount of 0.5 wt. % appears to be the borderline separating between the NF-MWCNTs acting as a nanocomposite. At 0.5 wt. % content, NF-MWCNTs act to improve the material through nano-scale effects on epoxy and NF-MWCNTs acting as reinforcing fibers.

At values higher than 0.5 wt. %, the significant increase in number of nanotubes present within the matrix, provides reinforcement that does not improve the strength but assists in crack propagation resistance and thus improves fracture toughness of PC. Using higher contents, NF-MWCNTs exhibit reinforcing mechanism increasing the plastic strain without improving the tensile strength. The increase of strain at failure is associated with a significant increase in toughness (energy absorption to failure).

Specific nanomaterials and epoxy that may be used with preferred embodiments of the present invention include the following: Nanoparticles: non-functionalized Multi-Walled Carbon Nanotubes (NF-MWCNT's), and/or non-functionalized carbon nanotubes with an outer diameter 20-nm, inner diameter 5-10 nm and 10-30 μm length, and/or non-functionalized Aluminum Nanoparticles (NF-ANP), and/or non-functionalized Aluminum Oxide ($Al_2O_3$) nanoparticles with maximum particle size of 50 nm, and/or non-functionalized Carbon Nanofibers (NF-CNFs), and/or non-functionalized carbon nanofibers with diameters 80-200 nm and length of 0.5-20 μm length and non-functionalized graphene nanoplatelets (GNPs). Epoxy (Resin and Hardener) that may be used includes low modulus polysulfide epoxy such as Bisphenol A/Epichlorohydrin with Silane. Hardener that may be used includes Diethylenetriamine (DETA), and/or Phenol, 4,4'-(1-methylethylidene)bis-, Tetraethyllenepentamine.

For a preferred embodiment, ratios that may be used (in kg/m$^3$) is as follows: Resin 300, Hardener 131, Powder 1630. Other types of epoxy including and not limited to polysulfide epoxy, novolac epoxy, amine epoxy, acrylic-epoxy co-polymers, MMA, polyester, styrene with different resin to hardener ratio and with different epoxy matrix to powder ratios also will enable producing similar polymer concretes with superior ductility when the above nanomaterials are incorporated in the mix.

Flowability test results are shown in FIG. 7. Flowability test results showed no significant decrease in PC flowability up to 1.0 wt. % NF-MWCNTs content when compared with neat PC. At NF-MWCNTs of 1.5 and 2.0 wt. %, PC showed a decrease of flowability of 17 and 26% respectively. Despite this decrease, PC incorporating 2.0 wt. % NF-MWCNTs was still flowable and it was possible to use to produce PC specimens. Increasing the NF-MWCNT's content beyond 2.0 wt. % will produce unflowable PC that would trap excess amount of air would not produce good PC. Flowability of PC enables its use in classical concreting and in concrete structures/elements produced using 3D printing.

Figure 8B:
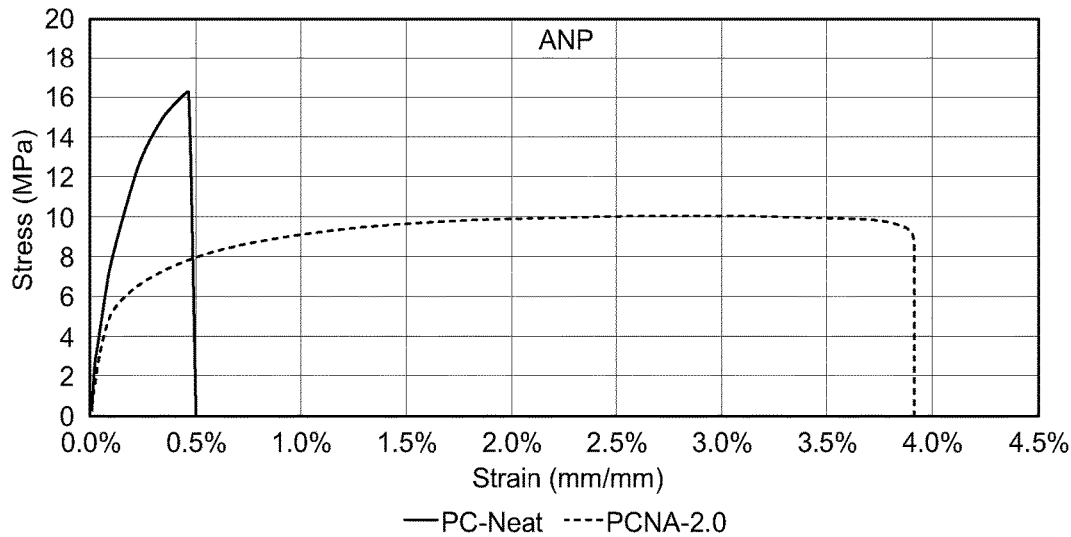
FIG. 8B illustrates another stress-strain of tension strain at failure of 4.0% for embodiments of the present invention using non-functionalized aluminum nanoparticles.

Results of the tension test showed that the stress-strain curves of PC incorporating NF-MWCNTs and ANPs were altered significantly. All PC incorporating NF-MWCNTs showed lower strength and much higher strain at failure as shown in FIG. 8. PCNC-2.0 and PCNC-0.5 reached a significant 2.5-4.0% strain at failure proving a high strength high strain material with a failure strain about one order of magnitude of strain at failure of normal concrete.

Figure 9:
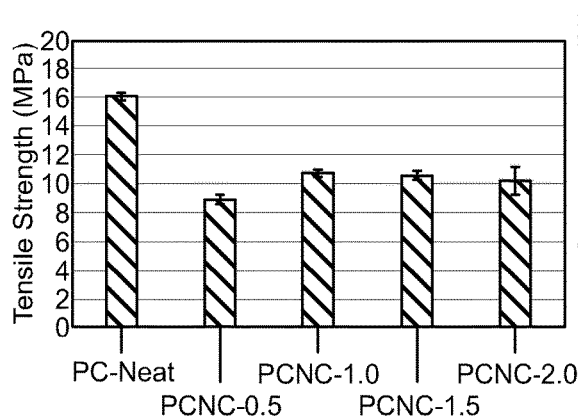
FIG. 9 shows tensile strength for an embodiment of the present invention.

FIG. 9 shows the decrease of tensile strength with the incorporation of NF-MWCNTs. The decrease was in the range of 33 to 45% with the largest decrease being that of PC with 0.5 wt. % NF-MWCNTs. Increasing the content of NF-MWCNTs beyond 1.0 wt. % showed no significant influence on the tensile strength of PC. This observation is in contrast to results reported early by others on the effect of functionalized NF-MWCNTs which was reported to improve the tensile strength of latex modified concrete.

Figure 10:
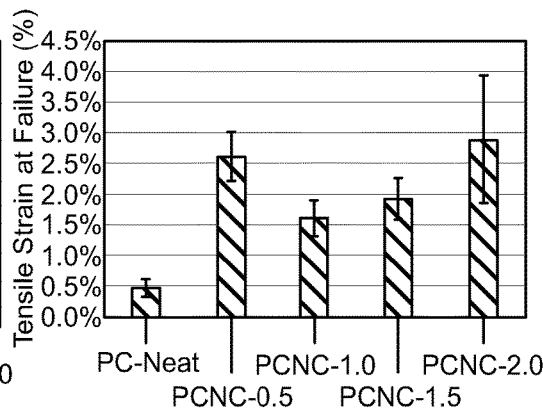
FIG. 10 depicts tensile strain at failure in tension test for an embodiment of the present invention.

On the other hand, incorporating NF-MWCNTs resulted in significant improvement in strain at failure when compared with neat PC. The improvement in strain ranged between 242% and 516% as shown in FIG. 10. Results of incorporating 1.0, 1.5 and 2.0 wt. % NF-MWCNTs show a linear trend of significant increase of strain at failure with the increase in content of NF-MWCNTs. PCNC-0.5 demonstrated a different trend. At 0.5 wt. % content (for this specific epoxy matrix) NF-MWCNTs produce a nano-scale effect that is different than that observed at a higher content. The amount of 0.5 wt. % might be the borderline separating between the NF-MWCNTs acting as a nanocomposite and NF-MWCNTs acting as a reinforcing fibers.

Figure 11:
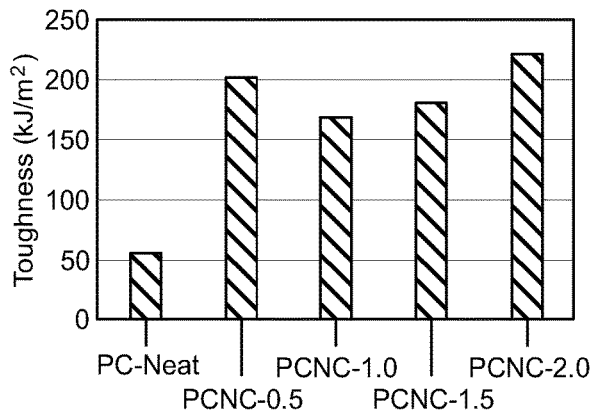
FIG. 11 shows toughness of PC in tension for an embodiment of the present invention.
Figure 14:
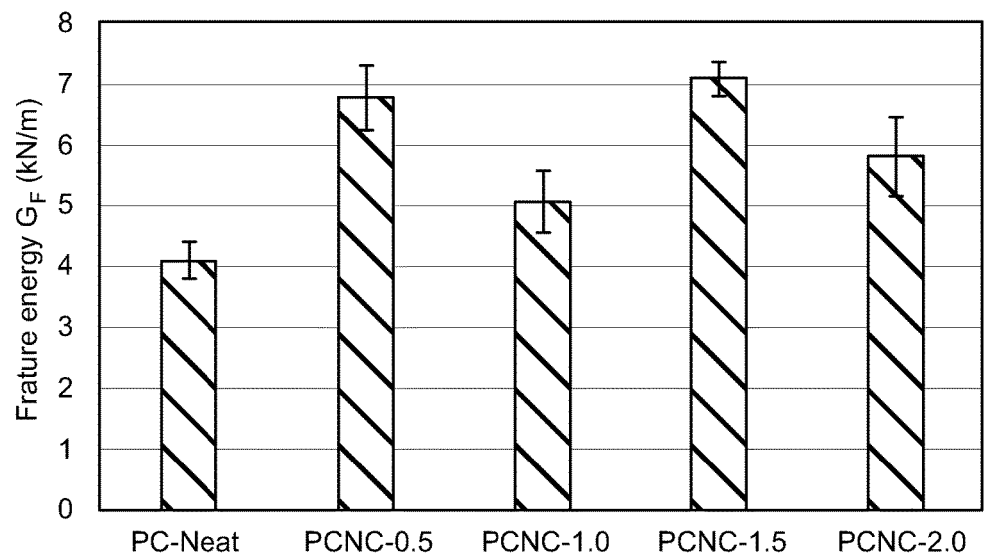
FIG. 14 shows fracture toughness energy for an embodiment of the present invention.

Using higher contents, NF-MWCNTs exhibit reinforcing mechanism that increase the plastic strain without improving the tensile strength. The increase of strain at failure is associated with a significant increase in toughness (energy absorption to failure). FIGS. 11 and 14 show similar general increase of toughness of PC with NF-MWCNTs compared with neat PC by PC incorporating 2.0 wt. % NF-MWCNTs having the highest increase in toughness of 295% compared with neat PC.

Figure 12:
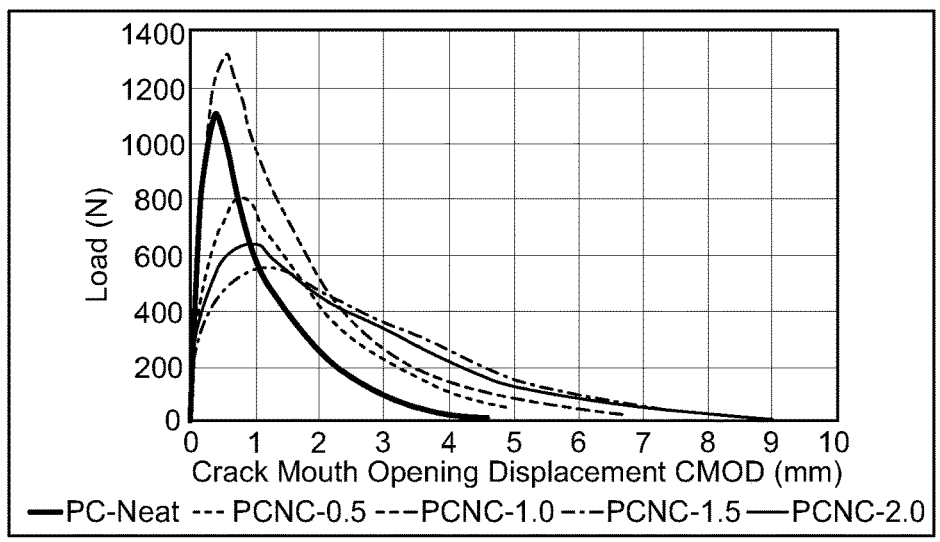
FIG. 12 provides Load-CMOD curves for PC incorporating NF-MWCNTs for an embodiment of the present invention.
Figure 13:
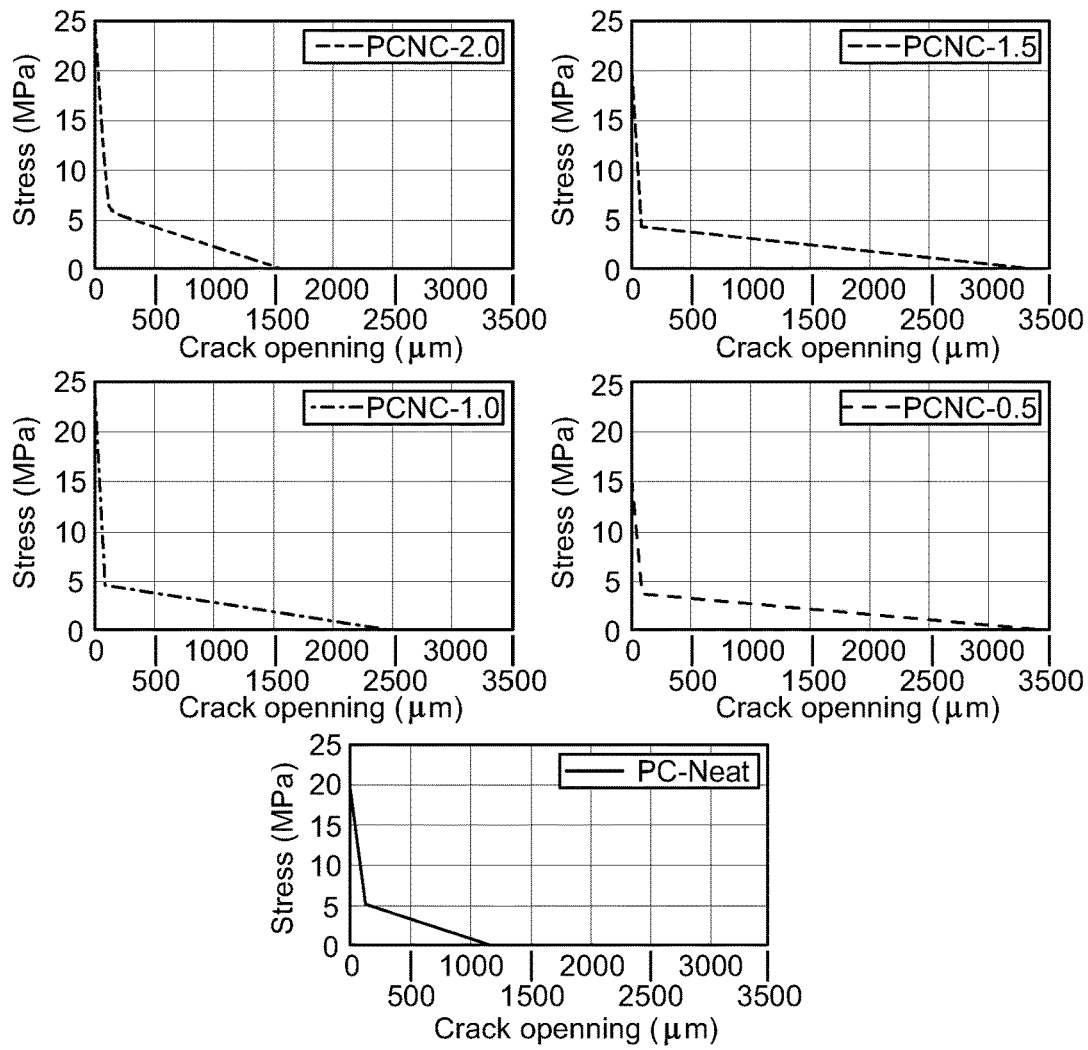
FIG. 13 provides bi-linear approximation tension stiffening curves for PC incorporating NF-MWCNTs for an embodiment of the present invention.

The load-CMOD measurements of PC incorporating NF-MWCNTs are shown in FIG. 12. It is apparent that incorporating NF-MWCNTs improved the tension stiffening of PC represented by the descending part of the load-CMOD curve. It should be noted that unlike ordinary concrete (OC), the CMOD observed with PC samples is significantly larger reaching values up to 9 mm. FIG. 13 shows the extent of crack opening versus stress bilinear relationship.

It is important to note the significant improvement of the bilinear relationship with incorporating 0.5-1.5 wt. % NF-MWCNTs. This improvement was lost by the increase in MWCNTs content to 2.0 wt. % The bilinear curve was used to calculate the fracture energy GF that represents the fracture toughness of all PC mixes incorporating NF-MW-CNTs. The addition of NF-MWCNTs resulted in increasing fracture toughness compared with neat PC in the range of 24% -73%. PC incorporating 1.5% NF-MWCNTs showed the highest increase in fracture toughness. At 1.0 wt. % NF-MWCNTs, fracture toughness increased by 24%. PCNC-1.5 and PCNC-0.5 showed excessive CM OD to failure and a yield-like behavior in the curve softening region. Hence, reaching significant increase in fracture toughness by 66% and 73% respectively, compared with neat PC. Unlike the trend depicted in tensile test for toughness and strain, PCNC-2.0 showed a decrease in fracture toughness when compared to PCNC-1.5 and PCNC-1.0.

In fact, in fracture testing, PCNC-2.0 showed significant increase in stiffness attaining a significantly high peak load which resulted in a decrease in its fracture toughness. The pattern of fracture toughness observations follows that from the tension test. At 0.5 wt. % content, NF-MWCNTs act to improve the material through nano-scale effects on epoxy. At values higher than 0.5 wt. %, the significant increase in number of nanotubes present within the matrix, provides reinforcement that does not improve the strength but assists in crack propagation resistance and thus improves fracture toughness of PC.

Table 3 shows the results of the critical limit of the least dimension for a material with the specified properties to be analyzed using LEFM. The least dimension required is 1490 mm and since all PC mixes have the same least dimension (25.4 mm).

TABLE 3

Least dimension check ensuring LEFM.

| Value | PC-Neat | PCNC-0.5 | PCNC-1.0 | PCNC-1.5 | PCNC-2.0 |
|---|---|---|---|---|---|
| E (GPa) | 14.2 | 6.07 | 11.2 | 9.37 | 5.53 |
| G$_F$ (kN/m) | 4.09 | 6.77 | 5.06 | 7.08 | 5.80 |
| σ$_y$ (MPa) | 16.1 | 8.9 | 10.7 | 10.6 | 10.2 |
| l (mm) | 560 | 1287 | 1231 | 1490 | 772 |

As shown, LEFM does not apply to PC. This can be explained by the significant nonlinearity observed in PC behavior specifically when MWCNTs are included. The above analysis show that significant improvement in fracture toughness of PC can be accomplished using NF-MWCNTs.

Figure 15:
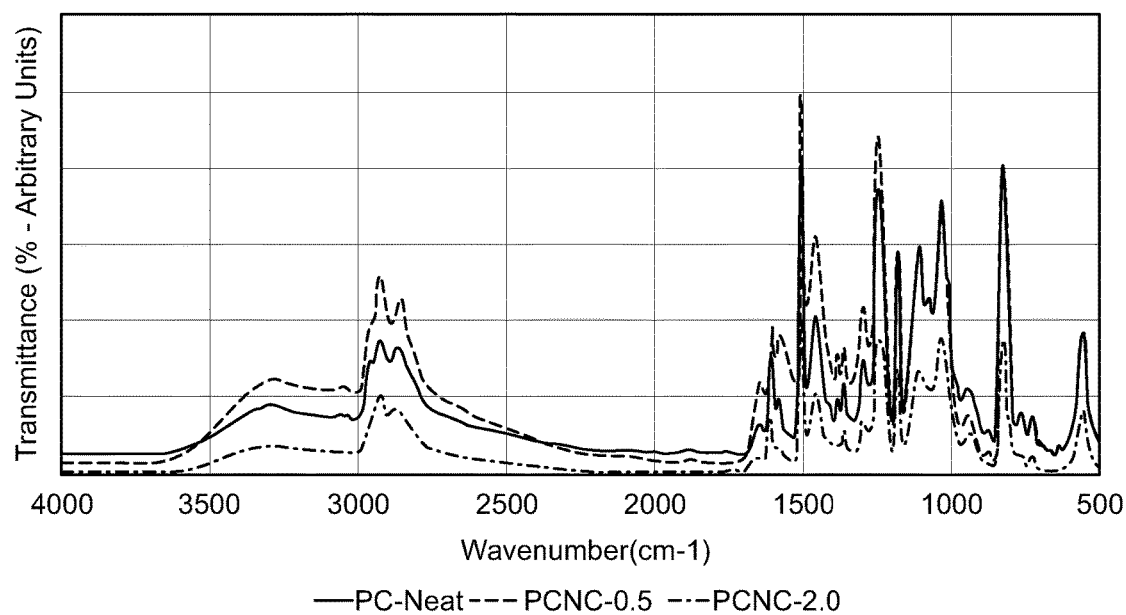
FIG. 15 provides FTIR spectrographs of epoxy mixes including neat, 0.5 and 2.0 wt. % NF-MWCNTs for an embodiment of the present invention.

FTIR spectrographs of neat epoxy and epoxy with 0.5 and 2.0 wt. % of NF-MWCNTs are shown in FIG. 15. The characteristic peaks of the synthesized siloxane-epoxy/NF-MWCNTs samples appeared at 3330-3500 cm$^{-1}$ (O—H), 2750-2940 cm$^{-1}$ (C—H), 1460 cm$^{-1}$ (C—H, CH2 and CH3), 1039-1100 cm$^{-1}$ (Si—O—Si and C—O—C), 1250-828 cm$^{-1}$ (C—H in Si—CH3), 560 cm$^{-1}$ (Si—O—Si). A peak appears near 1605 cm$^{-1}$ due to Si–C6H5 vibrations. The remaining epoxy groups (oxirane ring) appeared at 940 cm$^{-1}$. The spectrographs of the three MWCNTs show no significant difference or shift and thus do not indicate any chemical interaction with MWCNTs because non-functionalized NF-MWCNTs were used in the preparation of the PC composite. The ability of the relatively low content of non-functionalized NF-MWCNTs (0.5 wt. %) to alter the mechanical properties appear to be attributed to the interaction between the nanoscale NF-MWCNTs and epoxy. FTIR peaks in the spectrographs show that the peaks of the epoxy compounds in epoxy incorporating 0.5 wt. % NF-MWCNTs are higher in magnitude than those of the neat epoxy. FTIR peaks of epoxy incorporating 2.0 wt. % NF-MWCNTs are lower in magnitude than those of neat epoxy. The above observation can be explained by considering the ability of NF-MWCNTs to hinder epoxy reaction. At a low NF-MWCNTs content <0.5 wt. %, it seems that MWCNTs inhibit epoxy reaction resulting in lower cross-linking than that of neat epoxy. The reduced cross-linking in its turn results in reducing PC strength and improving PC strain at failure and fracture toughness.

On the other hand, increasing the NF-MWCNTs content gradually results in reducing NF-MWCNTs effect on epoxy reaction. That might be explained by the fact that NF-MWCNTs will tend to agglomerate at high content which would reduce their significance on the epoxy reaction. It is important to also note that high content of NF-MWCNTs such as 2.0 wt. % might entrap air and thus reduce strength. However, the relatively large NF-MWCNTs content helps in maintaining the integrity of PC and allows it to slightly improve the strength and strain at failure. It is apparent that the significance of NF-MWCNTs on strength and fracture can be explained based on its chemical effect at relatively low content <0.5 wt. % but the explanation becomes extremely complex with many interdependent factors at high NF-MWCNTs contents.

Figure 16:
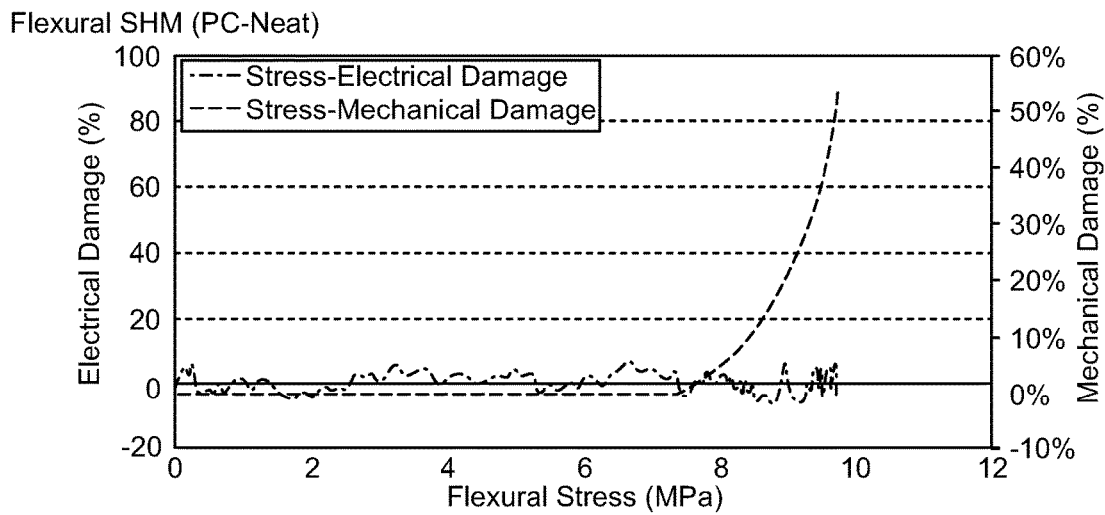
FIG. 16 shows a lack of correspondence and/or correlation for PC-Neat when comparing electrical and mechanical damage versus flexural stress.

FIG. 16 shows a lack of correspondence and/or correlation for PC-Neat when comparing electrical and mechanical damage versus flexural stress. This shows that while mechanical damage increase there is no corresponding change in electrical damage or the change in measured conductivity.

Figure 17:
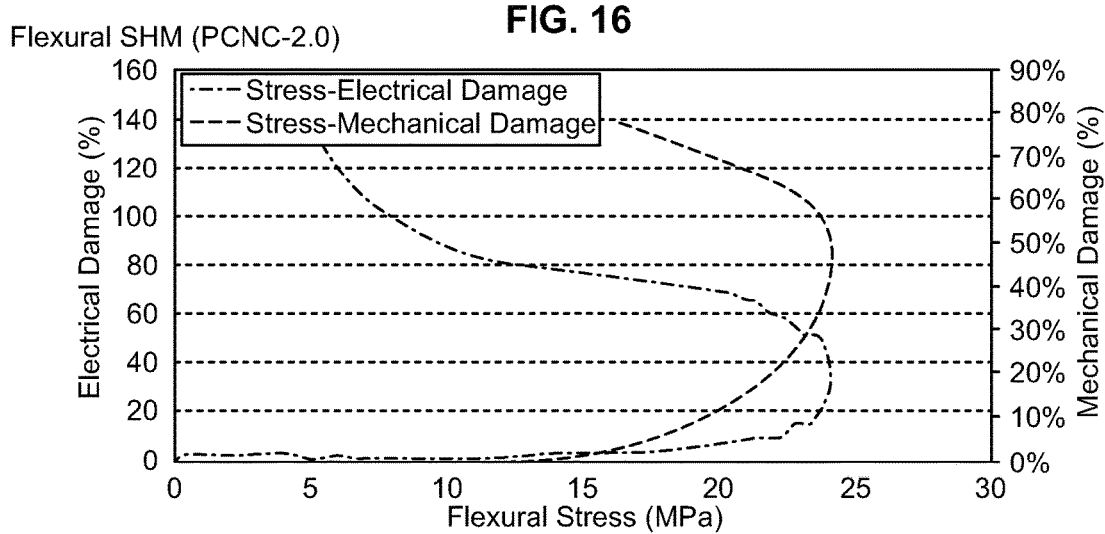
FIG. 17 shows strong correspondence and/or correlation for PCNC-2% when comparing electrical and mechanical damage versus flexural stress.
Figure 18:
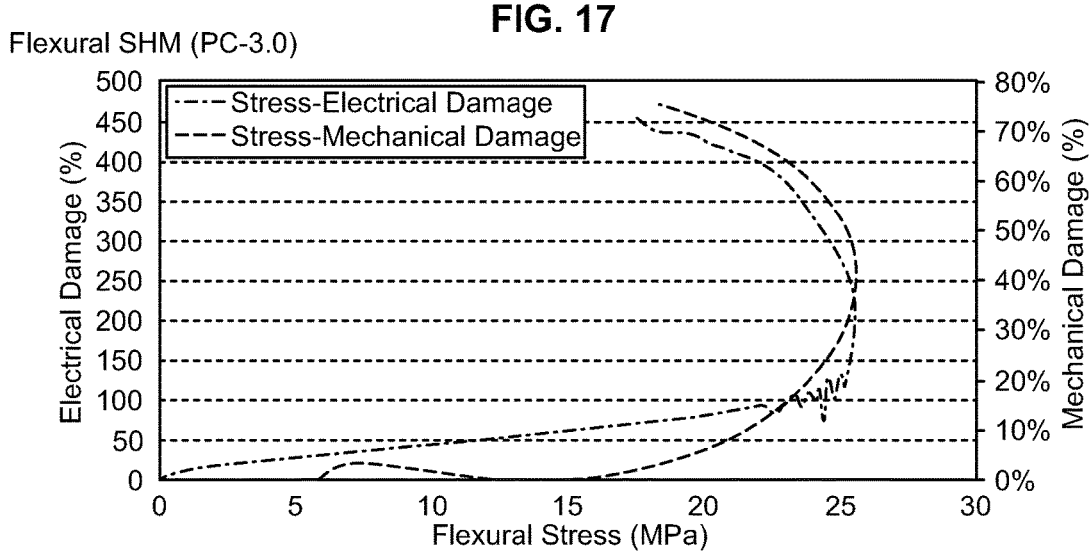
FIG. 18 shows strong correspondence and/or correlation for PCNC-3% when comparing electrical and mechanical damage versus flexural stress.

FIG. 17 shows a correspondence and/or correlation for PCNC-2% when comparing electrical and mechanical damage versus flexural stress. FIG. 18 also shows a correspondence and/or correlation for PCNC-3% when comparing electrical and mechanical damage versus flexural stress. The graphs of FIG. 17 and FIG. 18 show that as flexural stress increase to a maximum point, there is a positive slope to the line followed by a negative slope. That the curve for electrical damage and mechanical damage mimic each other, in this embodiment both form a sideways parabola, demonstrates that there is a measureable relationship between electrical damage and mechanical damage. This enables monitoring of a concrete structure such as by crack propagation in PC under static and cyclic loading. Successful monitoring in PC can enable early warning and thus allows interference to prevent fatigue cracking. Such development can extend the service life of many concrete structures such as bridge deck overlays, machine foundations, sewer manholes, pipes and pipe liners, hazard materials storage, parking structures, architectural panels and buildings, and thus can be a critical development for PC overlays.

This permits the monitoring the health of concrete structures by electrical means. The embodiments of the present invention may be used to monitor the health of a wide variety of concrete.

Figure 19:
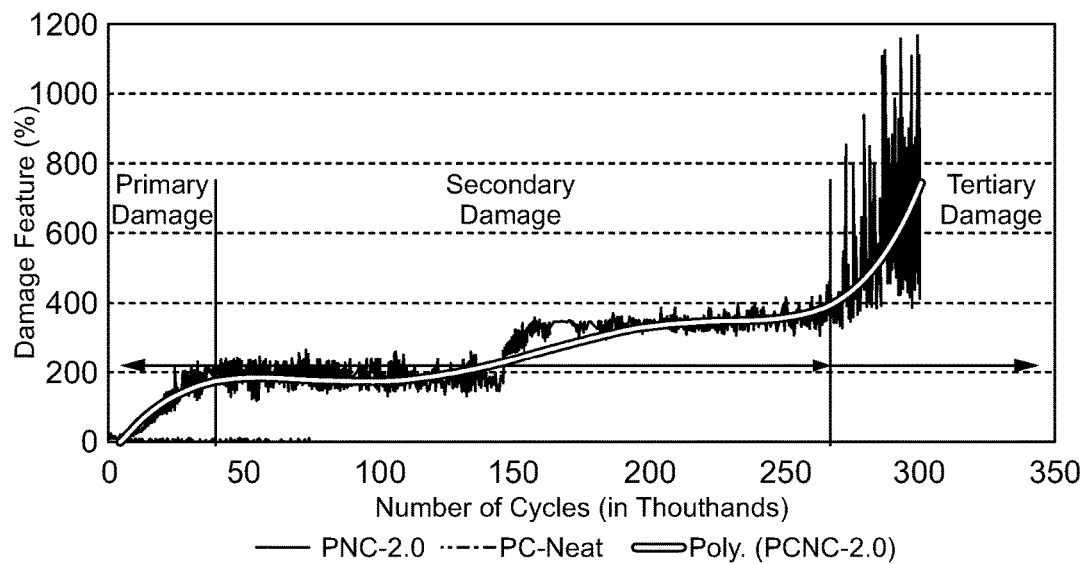
FIG. 19 shows three stages of fatigue measured through electrical measure.

FIG. 19 shows three stages of fatigue measured through electrical measure. The ability to monitor those stages recognize the ability of the proposed technology to realize the potential of fatigue failure prior to its occurrence and thus interfering to prevent such catastrophic failure.

Figure 20A:
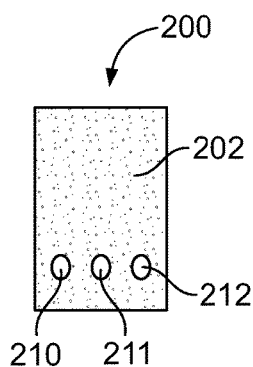
FIG. 20A shows how post-tensioning conduits incorporating the various embodiments of the present invention may be included in normal concrete to measure mechanical damage electrically for an embodiment of the present invention.
Figure 20B:
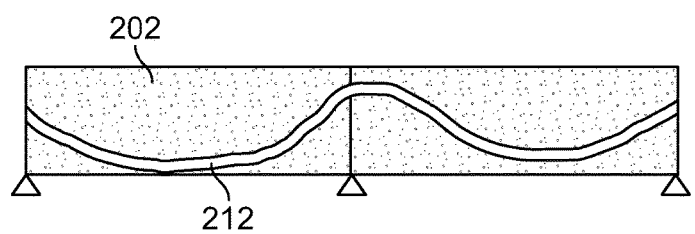
FIG. 20B also shows how post-tensioning conduits incorporating the various embodiments of the present invention may be included in normal concrete to measure mechanical damage electrically for an embodiment of the present invention.

FIGS. 20A and 20B show how conduits or ducts may be included in normal concrete 202 to measure mechanical damage electrically for an embodiment of the present invention. As shown, a newly formed or existing structure 200 may include one or more ducts 210-212 in normal concrete to measure mechanical damage electrically for an embodiment of the present invention. Ducts 210-212 include therein polymer concrete with nanomaterials to monitor damage in side "parts" of concrete as described for the various embodiments of the present invention. In a preferred embodiment, the ducts conduits may be a post-tensioned (PT) duct filled with polymer concrete with nanomaterials to monitor potential damage propagation/cracking inside the PT duct.

In yet other embodiments, one or more ducts may be used. The ducts may be linear or nonlinear configuration. In an optimal design, the ducts are configured to monitor the entire structure under surveillance. In one preferred embodiment, the present invention provides a method of monitoring crack propagation in concrete structures comprising providing in the concrete structure a layer, part or duct which includes an electrically conductive polymer concrete; establishing an electrical current in the electrically conductive polymer concrete duct/layer/part; and measuring crack propagation in this layer/part as a function of reduced electrical conductivity. In other applications of the method, crack propagation may be measured by observing the change in electrical conductivity. This will enable early detection of cracks, crack growth and corrosion initiation and propagation. Such early detection will enable interfering and thus stopping the corrosion and fatigue crack growth and catastrophic fatigue failures. The proposed technology can offer millions of cost savings by early interruption of corrosion and fatigue crack propagation.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An electrically conductive polymer concrete made of a polymer, said polymer having dispersed therein non-functionalized nanoparticles comprising non-functionalized multi-walled carbon nanotubes (NF-MWCNTs), non-functionalized carbon nanofibers, and non-functionalized nano-alumina; and said polymer comprising epoxy, methyl methacrylate, styrene or polyester, wherein non-functionalized nanoparticles are added to said polymer at or above a percolation level by weight of said polymer.

2. An electrically conductive polymer concrete made of a polymer, said polymer having dispersed therein non-functionalized nanoparticles comprising non-functionalized multi-walled carbon nanotubes (NF-MWCNTs), non-functionalized carbon nanofibers, and non-functionalized nano-alumina; and said polymer comprising epoxy, methyl methacrylate, styrene or polyester, wherein non-functionalized nanoparticles are added at 2.0-wt % by weight of said polymer, at 3.0-wt % by weight of said polymer or between 2.0-3.0-wt % by weight of said polymer.

3. The electrically conductive polymer concrete of claim 1 wherein said concrete is adapted to receive an electrical current to form a cathodic protection system for corrosion protection by opposing a corrosion current.

4. The electrically conductive polymer concrete of claim 1 wherein said concrete is adapted to receive an electrical current and to send current to a damaged portion of the concrete to self-heal.

5. The electrically conductive polymer concrete of claim 1 wherein said concrete has a strain failure above 2-3%.

6. The electrically conductive polymer concrete of claim 2 wherein the concrete is adapted to receive an electrical current to form a cathodic protection system for corrosion protection by opposing a corrosion current.

7. The electrically conductive polymer concrete of claim 2 wherein the concrete is adapted to receive an electrical current and to send current to a damaged portion of the concrete to self-heal.

* * * * *